United States Patent
Nam et al.

(10) Patent No.: US 8,467,799 B2
(45) Date of Patent: Jun. 18, 2013

(54) METHOD AND SYSTEM FOR ASSIGNING PHYSICAL UPLINK CONTROL CHANNEL (PUCCH) RESOURCES

(75) Inventors: Young-Han Nam, Richardson, TX (US); Jianzhong Zhang, Irving, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 379 days.

(21) Appl. No.: 12/844,693

(22) Filed: Jul. 27, 2010

(65) Prior Publication Data

US 2011/0045860 A1 Feb. 24, 2011

Related U.S. Application Data

(60) Provisional application No. 61/274,755, filed on Aug. 20, 2009.

(51) Int. Cl.
*H04W 72/00* (2009.01)

(52) U.S. Cl.
USPC ........ 455/450; 455/451; 455/452.1; 455/453; 455/454; 455/455

(58) Field of Classification Search
USPC ................................................ 455/450–455
See application file for complete search history.

(56) References Cited

U.S. PATENT DOCUMENTS

| | | | | |
|---|---|---|---|---|
| 8,259,602 B2* | 9/2012 | Kim et al. | ...... | 370/252 |
| 2009/0247174 A1* | 10/2009 | Zhang et al. | ...... | 455/450 |
| 2009/0290538 A1* | 11/2009 | Kim et al. | ...... | 370/328 |
| 2012/0147773 A1* | 6/2012 | Kim et al. | ...... | 370/252 |

* cited by examiner

*Primary Examiner* — Fayyaz Alam

(57) ABSTRACT

A base station includes a transmit path circuitry to transmit a downlink (DL) grant in a single control channel element (CCE) to a subscriber station in a subframe n-k while the subscriber station performs an orthogonal transmit diversity scheme using N transmit antennas (N-Tx ORT) with N being a positive integer greater than 1. The transmit path circuitry is further configured to transmit data streams to the subscriber station. The base station also includes a receive path circuitry to receive an acknowledgement signal from the subscriber station in response to the data streams. The acknowledgement signal is carried in at least two physical uplink control channel (PUCCH) resources in a subframe n. A first resource of the PUCCH resources corresponds to the control channel element used to transmit the downlink grant, and a second resource of the PUCCH resources is assigned by a mapping function.

28 Claims, 16 Drawing Sheets

METHOD AND SYSTEM FOR ASSIGNING PHYSICAL UPLINK CONTROL CHANNEL (PUCCH) RESOURCES

CROSS-REFERENCE TO RELATED APPLICATION(S) AND CLAIM OF PRIORITY

The present application is related to U.S. Provisional Patent Application No. 61/274,755, filed Aug. 20, 2009, entitled "CONTROL RESOURCE RESERVATION FOR UPLINK TRANSMIT DIVERSITY IN WIRELESS COMMUNICATION SYSTEMS". Provisional Patent Application No. 61/274,755 is assigned to the assignee of the present application and is hereby incorporated by reference into the present application as if fully set forth herein. The present application hereby claims priority under 35 U.S.C. §119(e) to U.S. Provisional Patent Application No. 61/274,755.

TECHNICAL FIELD OF THE INVENTION

The present application relates generally to wireless communications and, more specifically, to a method and system for assigning physical uplink control channel (PUCCH) resources.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station includes a transmit path circuitry configured to transmit a downlink (DL) grant in a single control channel element (CCE) to a subscriber station in a subframe n-k while the subscriber station performs an orthogonal transmit diversity scheme using N transmit antennas (N-Tx ORT) with N being a positive integer greater than 1. The transmit path circuitry is further configured to transmit data streams to the subscriber station. The base station also includes a receive path circuitry configured to receive an acknowledgement signal from the subscriber station in response to the data streams. The acknowledgement signal is carried in at least two physical uplink control channel (PUCCH) resources in a subframe n. A first resource of the at least two PUCCH resources is assigned by a first CCE index $n_{CCE}$ corresponding to the control channel element used to transmit the downlink grant in the subframe n-k, and a second resource of the at least two PUCCH resources is assigned by a mapping function. The mapping function assigns the second resource by mapping the first CCE index $n_{CCE}$ to an additional PUCCH resource index in the subframe n.

A method of operating a base station includes transmitting a downlink (DL) grant in a single control channel element (CCE) to a subscriber station in a subframe n-k while the subscriber station performs an orthogonal transmit diversity scheme using N transmit antennas (N-Tx ORT) with N being a positive integer greater than 1. The method also includes transmitting data streams to the subscriber station, and receiving an acknowledgement signal from the subscriber station in response to the data streams. The acknowledgement signal is carried in at least two physical uplink control channel (PUCCH) resources in a subframe n. A first resource of the at least two PUCCH resources is assigned by a first CCE index $n_{CCE}$ corresponding to the control channel element used to transmit the downlink grant in the subframe n-k, and a second resource of the at least two PUCCH resources is assigned by a mapping function. The mapping function assigns the second resource by mapping the first CCE index $n_{CCE}$ to an additional PUCCH resource index in the subframe n.

A subscriber station includes a transmit path circuitry configured to perform an orthogonal transmit diversity scheme using N transmit antennas (N-Tx ORT) with N being a positive integer greater than 1. The subscriber station also includes a receive path circuitry configured to receive a downlink (DL) grant in a single control channel element (CCE) from a base station in a subframe n-k, while the transmit path circuitry performs the orthogonal transmit diversity scheme using N transmit antennas (N-Tx ORT). The receive path circuitry is further configured to receive data streams from the base station. The transmit path circuitry is further configured to transmit an acknowledgement signal to the base station in response to the data streams. The acknowledgement signal is carried in at least two physical uplink control channel (PUCCH) resources in a subframe n. A first resource of the at least two PUCCH resources is assigned by a first CCE index $n_{CCE}$ corresponding to the control channel element used to transmit the downlink grant in the subframe n-k, and a second resource of the at least two PUCCH resources is assigned by a mapping function. The mapping function assigns the second resource by mapping the first CCE index $n_{CCE}$ to an additional PUCCH resource index in the subframe n.

A method of operating a subscriber station is provided. The method comprises performing an orthogonal transmit diversity scheme using N transmit antennas (N-Tx ORT) with N being a positive integer greater than 1. The method also comprises receiving a downlink (DL) grant in a single control channel element (CCE) from a base station in a subframe n-k, while the transmit path circuitry performs the orthogonal transmit diversity scheme using N transmit antennas (N-Tx ORT), and receiving data streams from the base station. The method further comprising transmitting an acknowledgement signal to the base station in response to the data streams. The acknowledgement signal is carried in at least two physical uplink control channel (PUCCH) resources in a subframe n. A first resource of the at least two PUCCH resources is assigned by a first CCE index $n_{CCE}$ corresponding to the control channel element used to transmit the downlink grant in the subframe n-k, and a second resource of the at least two PUCCH resources is assigned by a mapping function. The mapping function assigns the second resource by mapping the first CCE index $n_{CCE}$ to an additional PUCCH resource index in the subframe n.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
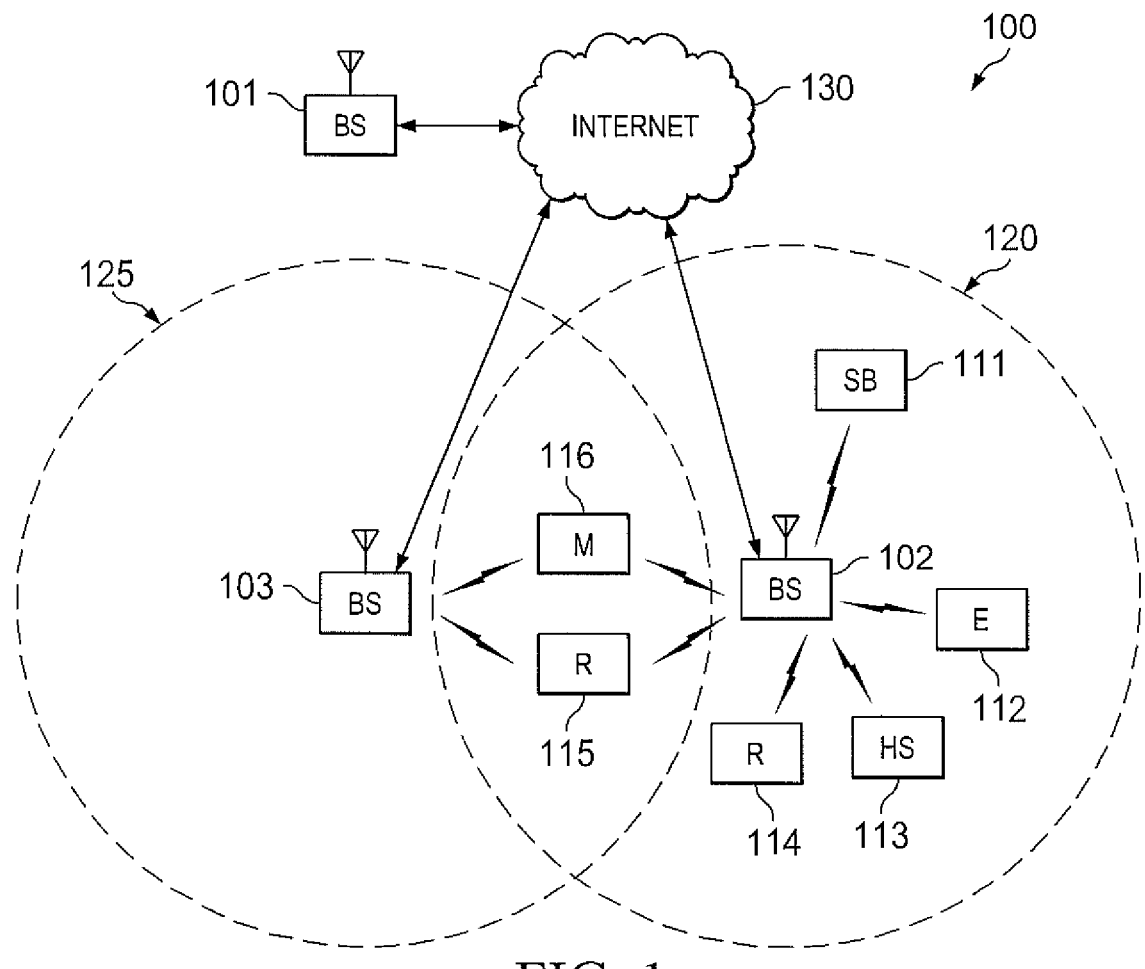
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
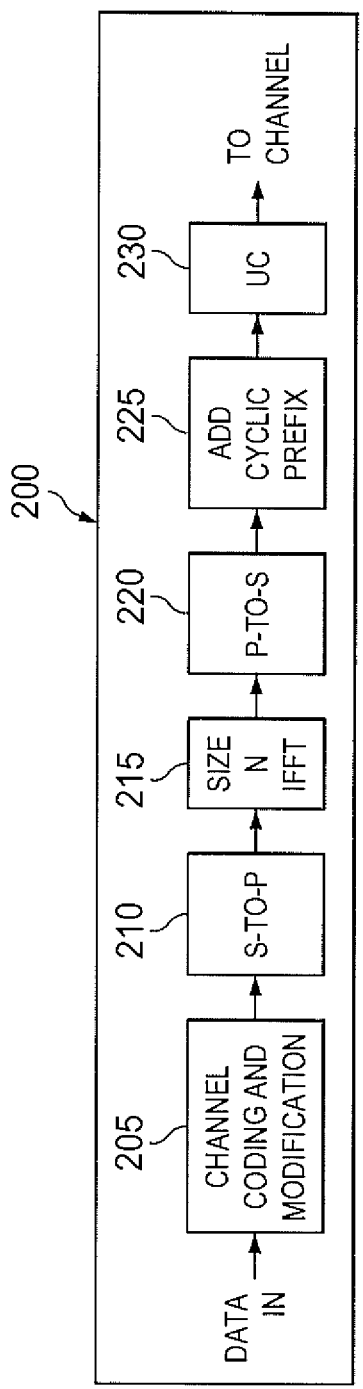
FIG. 2 is a high-level diagram of an Orthogonal Frequency Division Multiplexing (OFDMA) transmitter according to one embodiment of the disclosure.
Figure 3:
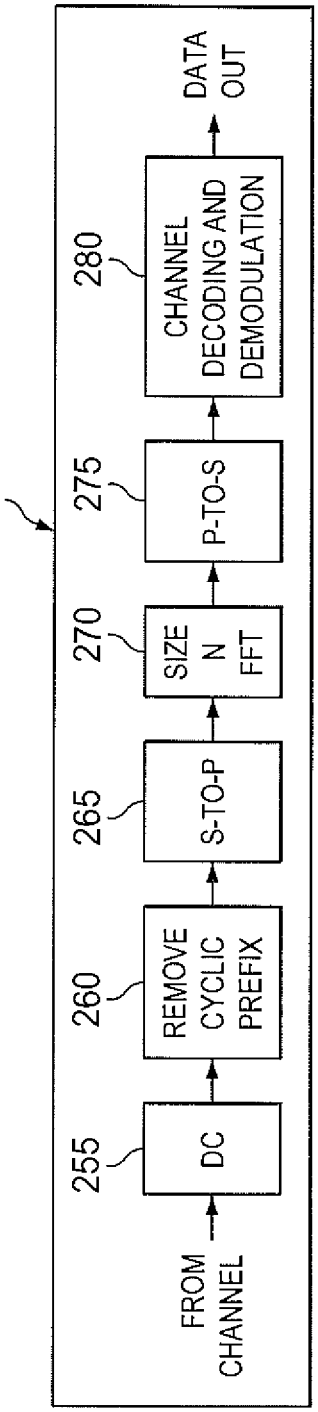
FIG. 3 is a high-level diagram of an OFDMA receiver according to one embodiment of the disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to- P) block 210, a Size N Inverse Fast Fourier Transform (IFFT) block 215, a parallel-to-serial (P-to-S) block 220, an add cyclic prefix block 225, and an up-converter (UC) 230.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL} N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL} N_{sc}^{RB}-1$ and $l=0, \ldots, N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
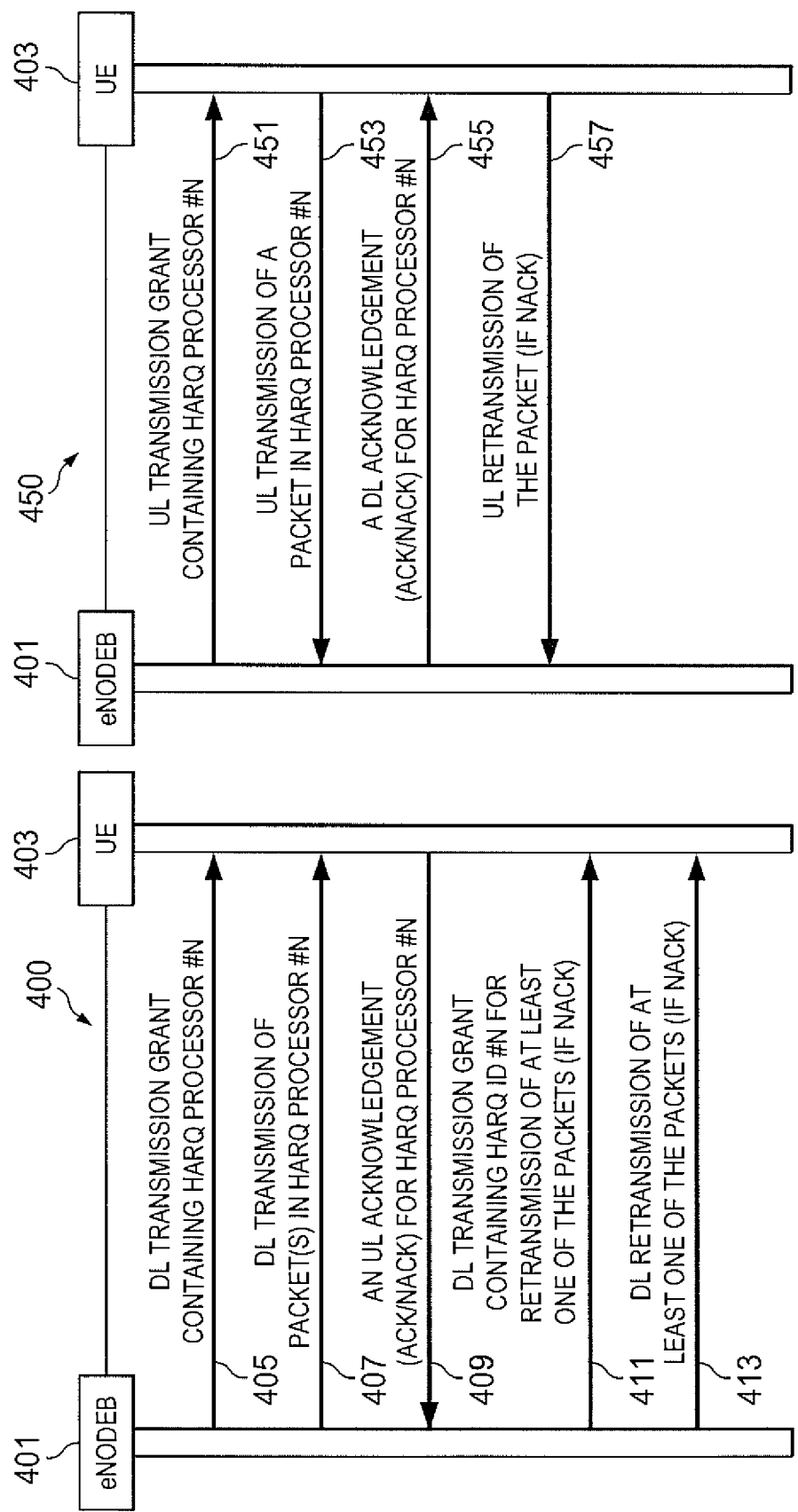
FIG. 4 illustrates signal exchanges between an enhanced node B (eNodeB) and a user equipment (UE) in a long term evolution (LTE) system according to one embodiment of the disclosure.

FIG. 4 illustrates signal exchanges between an enhanced node B (eNodeB) 401 and a user equipment (UE) 403 in an LTE system according to one embodiment of the disclosure.

In the current LTE specification, an eNodeB and a UE exchange physical signals associated with a hybrid automatic repeat request (HARQ) process.

For DL transmission to the UE 403 as shown at flow diagram 400, the eNodeB 401 transmits a DL transmission grant to the UE 403 containing a HARQ ID number #n in a subframe (flow 405). In the same subframe, the eNodeB 401 also transmits up to two packets (or TBs) for the HARQ process to the UE 403 (flow 407). In four subframes later, the UE 403 sends an acknowledgement of the packets in the HARQ process #n back to the eNodeB 401 (flow 409). The acknowledgement signal contains up to two bits for the two packets, and each bit indicates the decoding result at the UE. If the UE 403 successfully decodes a packet, the acknowledgement signal will have an acknowledgement (ACK) bit for the packet; otherwise, the acknowledgement signal will have a negative or non-acknowledgement (NACK) bit for the packet. If a NACK is received for a packet, the eNodeB 401 sends a transmission grant containing the HARQ ID #n (flow 411) and a retransmission packet for the HARQ process to the UE 403 (flow 413) a few subframes later than the subframe that the eNodeB 401 received the NACK.

For UL transmission from the UE 403 as shown at flow diagram 450, the eNodeB 401 transmits a UL transmission grant to the UE 403 containing a HARQ ID number #n in a subframe (flow 451).

In 4 subframes later, the UE 403 transmits a packet for the HARQ process to the eNodeB 401 (flow 453). In a subframe that is 4 subframes later, the eNodeB 401 sends an acknowledgement of the packet in a HARQ process #n back to the UE 403 (flow 455). If the eNodeB 401 successfully decodes the packet, the eNodeB 401 sends back an ACK; otherwise, the eNodeB 401 sends back a NACK to the UE 403. If a NACK is received, the UE 403 retransmits the packet for the HARQ process to the eNodeB 401 in four subframes later than the subframe that the UE 403 received the NACK (flow 457).

Figure 5:
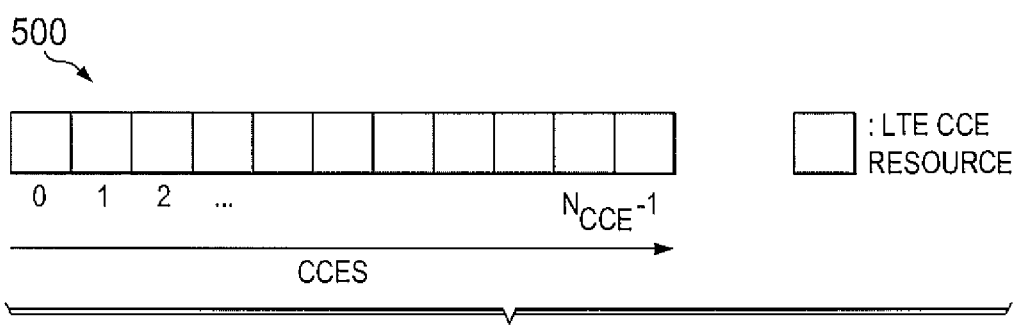
FIG. 5 illustrates control channel elements (CCEs) in a downlink carrier in an LTE system according to one embodiment of the disclosure.

FIG. 5 illustrates control channel elements (CCEs) 500 in a downlink carrier in an LTE system according to one embodiment of the disclosure.

As shown in FIG. 5, a physical downlink control channel (PDCCH) that carries downlink control information (DCI) is transmitted on an aggregation of one or several consecutive control channel elements (CCEs) 500. The CCEs available in the DL carrier are numbered from 0 to $N_{CCE}-1$.

Figure 6:
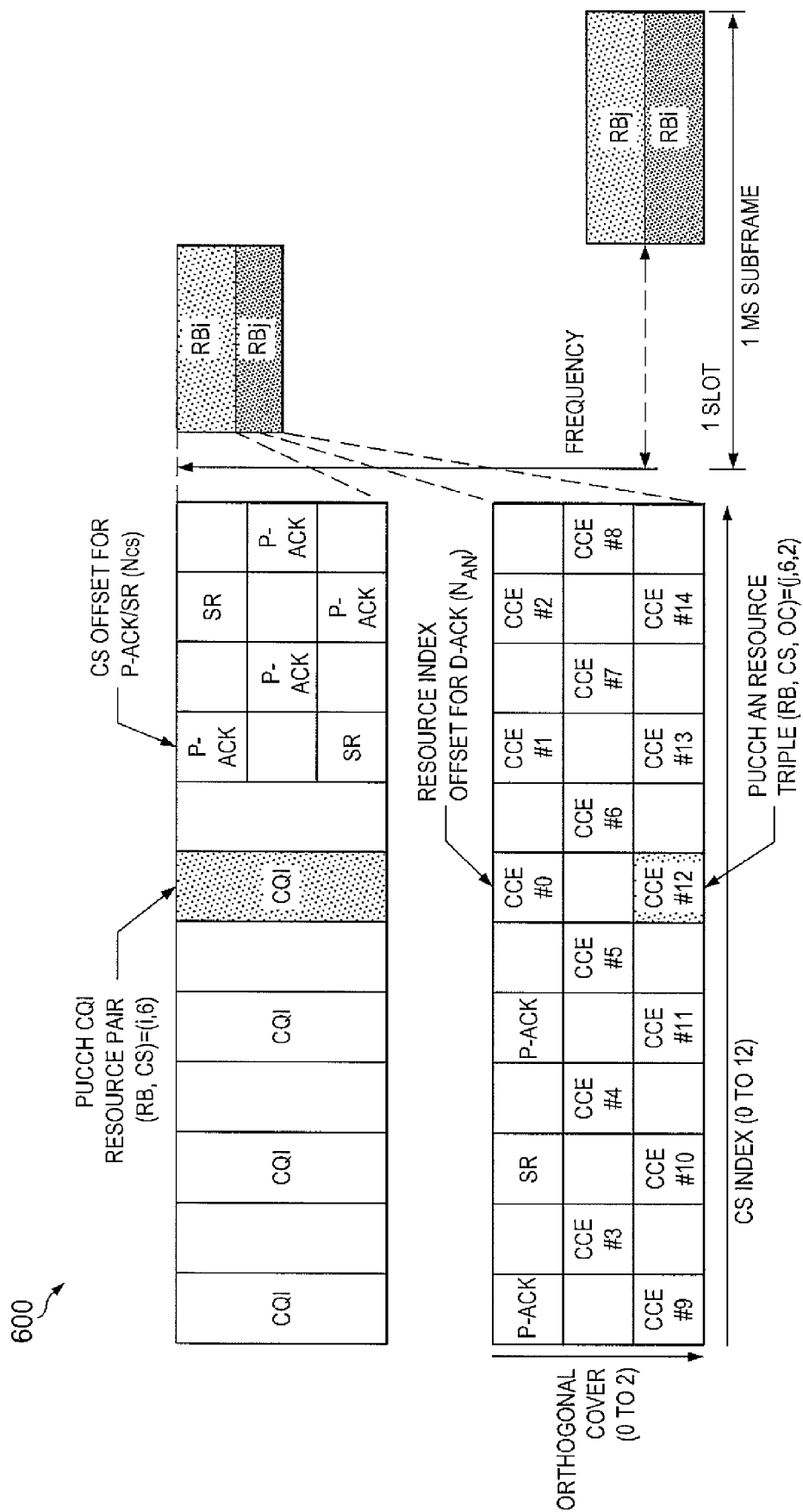
FIG. 6 illustrates a physical uplink control channel (PUCCH) of an LTE system according to one embodiment of the disclosure.

FIG. 6 illustrates a physical uplink control channel (PUCCH) 600 of an LTE system according to one embodiment of the disclosure.

In this embodiment, the physical uplink control channel (PUCCH) 600 is divided into multiple regions: a CQI region, a persistent-ACK/NACK and scheduling request region (P-ACK/NACK/SR) and a dynamic ACK/NACK region (D-ACK). As shown in FIG. 6, a CQI resource is uniquely identified by its resource pair, i.e., a CS index and an RB index. On the other hand, a P-ACK/SR or a D-ACK resource is uniquely identified by its resource triple, i.e., a CS index, an orthogonal cover (OC) index and an RB index.

A D-ACK is mapped to a PUCCH AN resource triple from an index $n_{PUCCH}^{(1)}$, where $n_{PUCCH}^{(1)}$ is obtained as described in Section 10.1 in 36.213 of 3GPP TS 36213 V8.4.0, "3rd Generation Partnership Project; Technical Specification Group Radio Access Network; Evolved Universal Terrestrial Radio Access (E-UTRA); Physical Layer Procedures (Release 8)", September 2008, which is hereby incorporated by reference into the present application as if fully set forth herein.

For frequency-division duplexing (FDD), the UE uses PUCCH resource $n_{PUCCH}^{(1)}$ for transmission of HARQ-ACK in subframe n, where for a physical downlink shared channel (PDSCH) transmission indicated by the detection of a corresponding PDCCH in subframe n−4, the UE uses $n_{PUCCH}^{(1)}=n_{CCE}+n_{PUCCH}^{(1)}$, where $n_{CCE}$ is the number of the first CCE used for the transmission of the corresponding DCI assignment and $n_{PUCCH}^{(1)}$ is configured by higher layers, and for a PDSCH transmission where there is not a corresponding PDCCH detected in subframe n-4, the value of $n_{PUCCH}^{(1)}$ is determined according to higher layer configuration and Table 9.2-2 of 3GPP TS 36213 V8.4.0, "3rd Generation Partnership Project; Technical Specification Group Radio Access Network; Evolved Universal Terrestrial Radio Access (E-UTRA); Physical Layer Procedures (Release 8)", September 2008, which is hereby incorporated by reference into the present application as if fully set forth herein.

In summary, in the LTE system, there is a one-to-one mapping function from a CCE index in subframe n, to a PUCCH AN resource triple in subframe n-k.

On the other hand, in the 3GPP LTE-A contributions, a transmit diversity scheme for PUCCH utilizing multiple orthogonal resources is proposed, called as orthogonal transmit diversity scheme (ORT). When ORT for two transmit antenna is utilized, two PUCCH resources are utilized by a UE. The UE transmits a control message via two transmit antennas, where one transmit antenna transmits a signal in a first PUCCH resource, and the other transmit antenna transmits the same signal in a second PUCCH resource. This concept can be extended to arbitrary number of antennas. In the case of D-ACK, a number of CCE resources are used for the transmission of a DL grant for a UE, and the number of PUCCH resources are allocated to the UE. When the number is greater than or equal to the number of transmit antenna involved in the ORT transmission, a rule may be defined to choose specific PUCCH resources for the ORT transmission. On the other hand, in the case of CQI, existing LTE systems assign one CQI resource by radio resource control (RRC) signaling.

Accordingly, a method to assign multiple CQI resources to UEs that will transmit CQI using ORT would be useful. However, if the number of CCEs used for DL grant for a UE in subframe n-k is less than N, the UE cannot implement ORT in subframe n with the LTE method of PUCCH D-ACK resource allocation. Similarly, an eNodeB allocates only one PUCCH CQI resource and only one PUCCH P-ACK/SR for a UE by the RRC signaling. Hence, with the LTE method of PUCCH CQI and P-ACK resource allocation, a UE cannot implement ORT requiring multiple PUCCH resources.

The present disclosure provides a system and method of assigning a sufficient number of PUCCH resources for UEs utilizing an ORT transmit diversity scheme for PUCCH control message transmission.

In a first case, additional PUCCH D-ACK/NACK region (D-ACK) resources are assigned to a UE that has received a number of CCEs for its DL grant that is less than a number of resources needed for ORT.

In such a case, it is assumed that only one CCE has been used for carrying the DL grant for the UE in subframe n-k and that a one-to-one mapping rule is defined from a CCE index used for a DL grant to a PUCCH D-ACK resource triple. Then, the UE will have only one PUCCH D-ACK resource available for D-ACK transmission in subframe n. In order to allow the UE to do 2-Tx ORT, one more PUCCH D-ACK resource is assigned to the UE in subframe n with the condition that the additional PUCCH D-ACK resource assigned to the UE is not used for the other UEs' PUCCH D-ACK transmissions.

In one embodiment of the current disclosure, a first number of additional PUCCH D-ACK resources are assigned to a UE to allow the UE to do N-Tx ORT in subframe n when a second number of CCEs is used for the DL grant for the UE in subframe n-k, where the second number is smaller than N and the sum of the first number and the second number is equal to N. To this end, a mapping function from one of the PUCCH D-ACK resource indices in subframe n corresponding to the CCE indices that have carried DL grant for a UE in subframe n-k to the indices of the additional PUCCH D-ACK resources for the UE in subframe n is defined. To prevent one PUCCH D-ACK resource from being used by multiple UEs in the subframe n, an eNodeB does not send DL grants for other UEs in the CCE resources in subframe n-k that correspond to the additional PUCCH D-ACK resources assigned to a UE implementing ORT (denoted by restricted CCEs).

Figure 7:
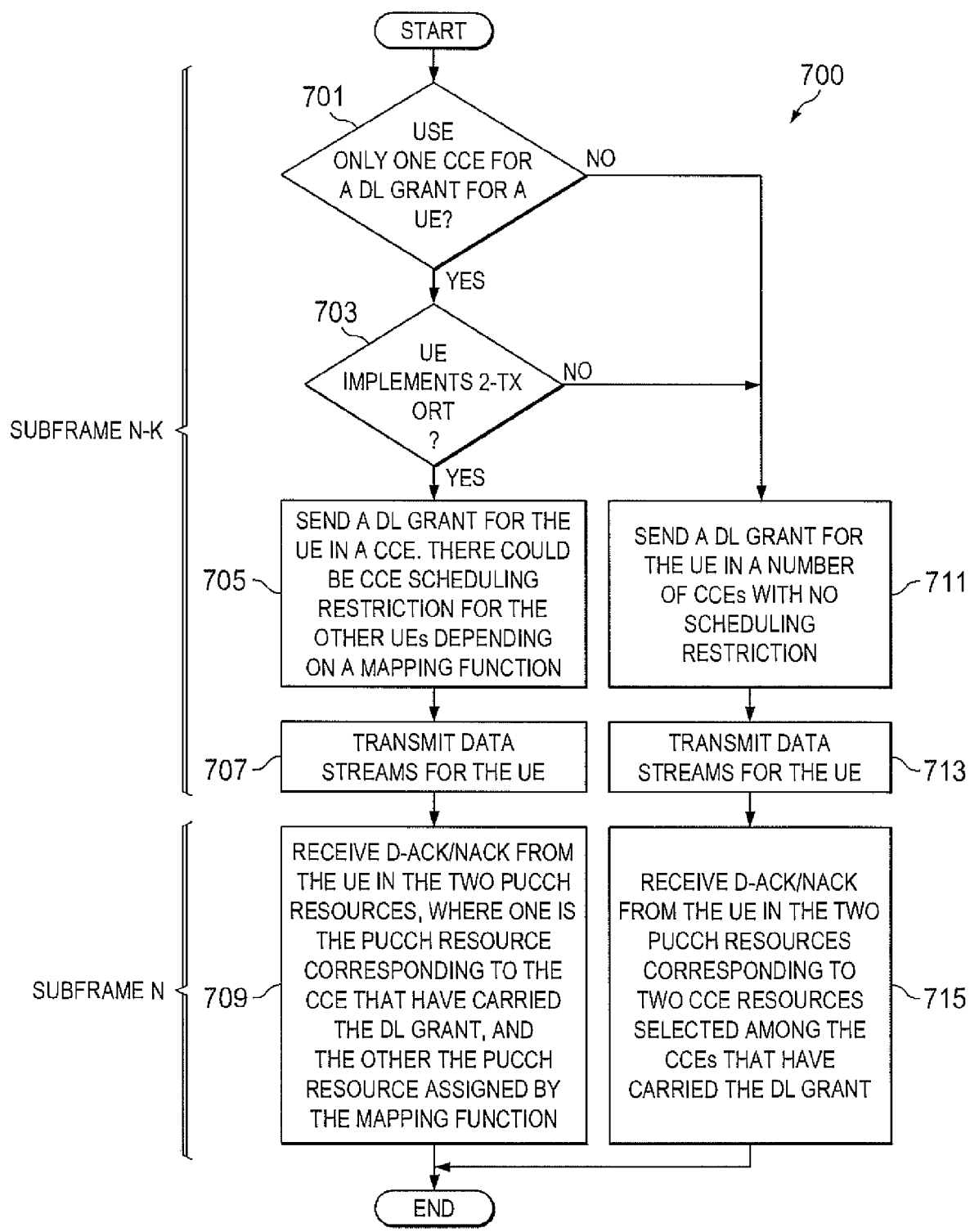
FIG. 7 illustrates a method of reserving CCEs at an eNodeB according to an embodiment of the disclosure.

FIG. 7 illustrates a method 700 of reserving CCEs at an eNodeB according to an embodiment of the disclosure.

As shown in FIG. 7, the eNodeB determines if the eNodeB will use only one CCE for a DL grant for a UE (block 701). If the eNodeB uses only one CCE for a DL grant for the UE, the eNodeB then determines if the UE will implement 2-TX ORT (block 703). If the UE implements 2-TX ORT, the eNodeB sends a DL grant for the UE in a CCE (block 705). In some cases, there could be a CCE scheduling restriction for the other UEs depending on a mapping function. The eNodeB transmits data streams for the UE (block 707). The eNodeB then receives a D-ACK/NACK from the UE in the two PUCCH resources, where one is the PUCCH resource corresponding to the CCE that carried the DL grant, and the other is the PUCCH resource assigned by a mapping function (block 709).

If the eNodeB does not use only one CCE for a DL grant for the UE, the eNodeB sends a DL grant for the UE in a number of CCEs with no scheduling restriction (block 711) and transmits data streams for the UE (block 713). The eNodeB then receives a D-ACK/NACK from the UE in the two PUCCH resources corresponding to the two CCE resources selected among CCEs that have carried the DL grant (block 715).

Figure 8:
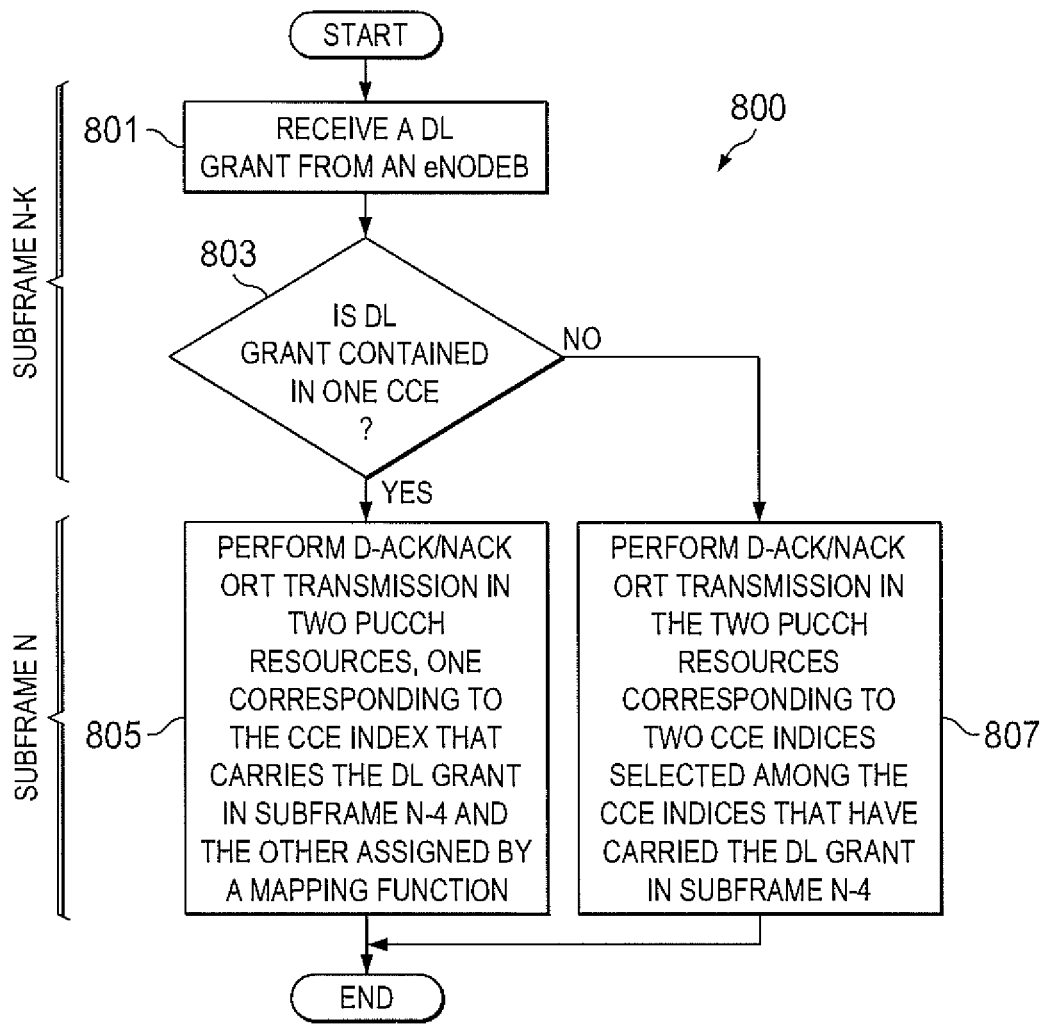
FIG. 8 illustrates a method of implementing a 2-TX orthogonal transmit diversity scheme (ORT) at a UE according to an embodiment of the disclosure.

FIG. 8 illustrates a method 800 of implementing a 2-TX orthogonal transmit diversity scheme (ORT) at a UE according to an embodiment of the disclosure.

As shown in FIG. 8, the UE receives a DL grant from an eNodeB (block 801). The UE then determines if the DL grant is contained in one CCE (block 803). If the DL grant is contained in one CCE, the UE performs D-ACK/NACK ORT transmission in two PUCCH resources, one PUCCH resource corresponding to the CCE that carried the DL grant in subframe n-4, and the other is the PUCCH resource assigned by a mapping function (block 805). If the DL grant is not contained in one CCE, the UE performs D-ACK/NACK ORT transmission in the two PUCCH resources corresponding to the two CCE indices selected among the CCEs that have carried the DL grant in subframe n-4.

Although FIGS. 7 and 8 are described in terms of a 2-Tx ORT, one of ordinary skill in the art would recognize that the methods of FIGS. 7 and 8 can easily be modified if other numbers of Tx antennas are used for ORT or if other numbers of CCEs have carried the DL grant.

In one example, k=4, just as in the LTE system.

The one-to-one mapping rule from a CCE resource index to a PUCCH D-AN resource triple can be similarly defined as in LTE. For example, in subframe n, the PUCCH D-AN resources are allocated by the formula $n_{PUCCH}^{(1)} = n_{CCE} + n_{PUCCH}^{(1)}$, where $n_{CCE}$ CCE index in subframe n-k and $n_{PUCCH}^{(1)}$ is obtained in the higher-layer signaling;

$n_{PUCCH}^{(1)}$ is the PUCCH D-AN index that is used for PUCCH physical resource mapping described in FIG. 6, or the method to locate the PUCCH D-AN resources described in 5.4.1 in 36.211 of 3GPP TS 36211 V8.4.0, "3rd Generation Partnership Project; Technical Specification Group Radio Access Network; Evolved Universal Terrestrial Radio Access (E-UTRA); Physical Channels and Modulation (Release 8)", September 2008, which is hereby incorporated by reference into the present application as if fully set forth herein; and overall, there is a one-to-one mapping from $n_{CCE}$ to $n_{PUCCH}^{(1)}$, and a resource mapping function from $n_{PUCCH}^{(1)}$ to a PUCCH D-AN resource index triple: a cyclic shift (CS) index, an orthogonal cover sequence (OC) index and a resource block (RB) index.

Multiple mapping functions from a PUCCH resource index corresponding to one of the CCE indices carrying the DL grant to additional PUCCH resource indices are considered. The CCE index used as an input for the mapping functions can be the largest index, for example. It is noted that shaded blocks 705 and 709 of FIG. 7 and block 805 of FIG. 8 are the relevant blocks where one of these mapping functions would take effect. For example, for 2-Tx ORT, when only one CCE carries the DL grant for a UE in subframe n-k, an additional PUCCH resource can be found as illustrated in the following embodiments.

Figure 9:
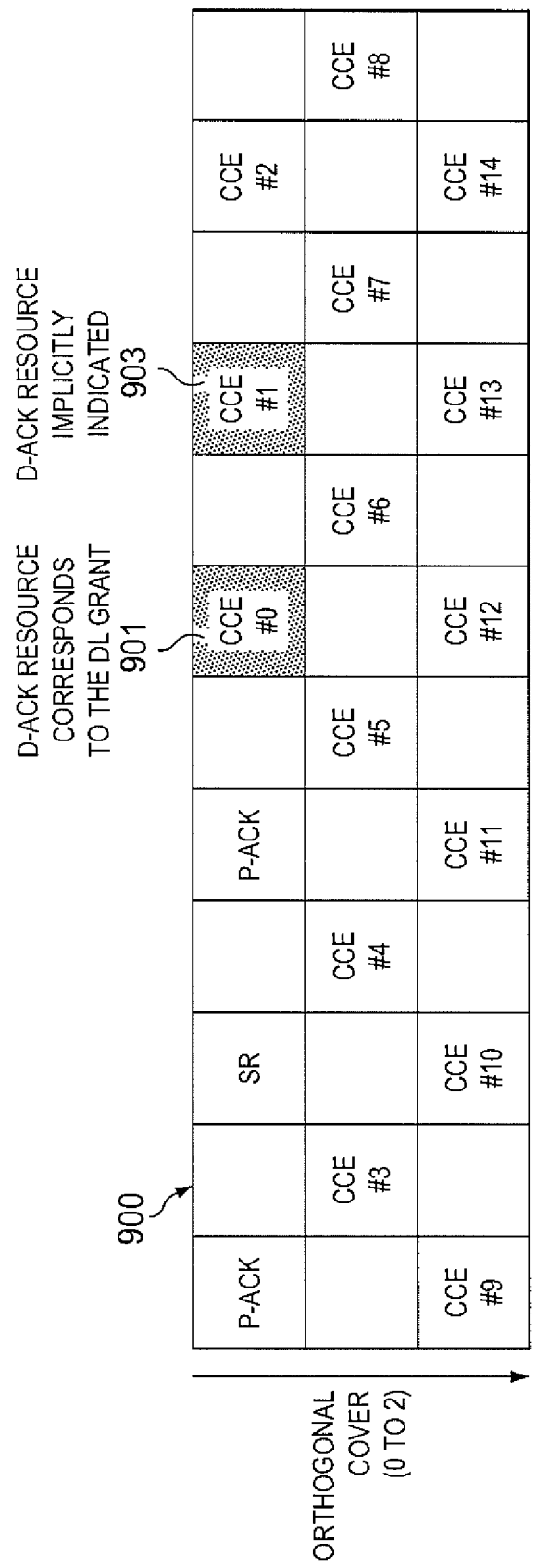
FIG. 9 illustrates a physical uplink control channel (PUCCH) resource map according to a first embodiment of the disclosure.

FIG. 9 illustrates a PUCCH resource map 900 according to a first embodiment of the disclosure.

In the first embodiment, the additional PUCCH resource index for the UE in subframe n is the PUCCH resource index corresponding to the CCE index $n_{CCE}+1$ if the CCE index having carried the UE's DL grant in subframe n-k is $n_{CCE}$. For example, if CCE#0 carries the DL grant for a UE in subframe n-k, then two PUCCH resources corresponding to CCE#0 and CCE#1 will be used for 2-Tx ORT in subframe n. In addition, the eNodeB would not use CCE#1 in subframe n-k for the other UEs' DL grant (i.e., CCE#1 is restricted).

As shown in FIG. 9, the PUCCH resource map 900 in subframe n has two filled squares 901 and 903 that are the two PUCCH resources assigned to the UE according to the first embodiment.

Figure 10:
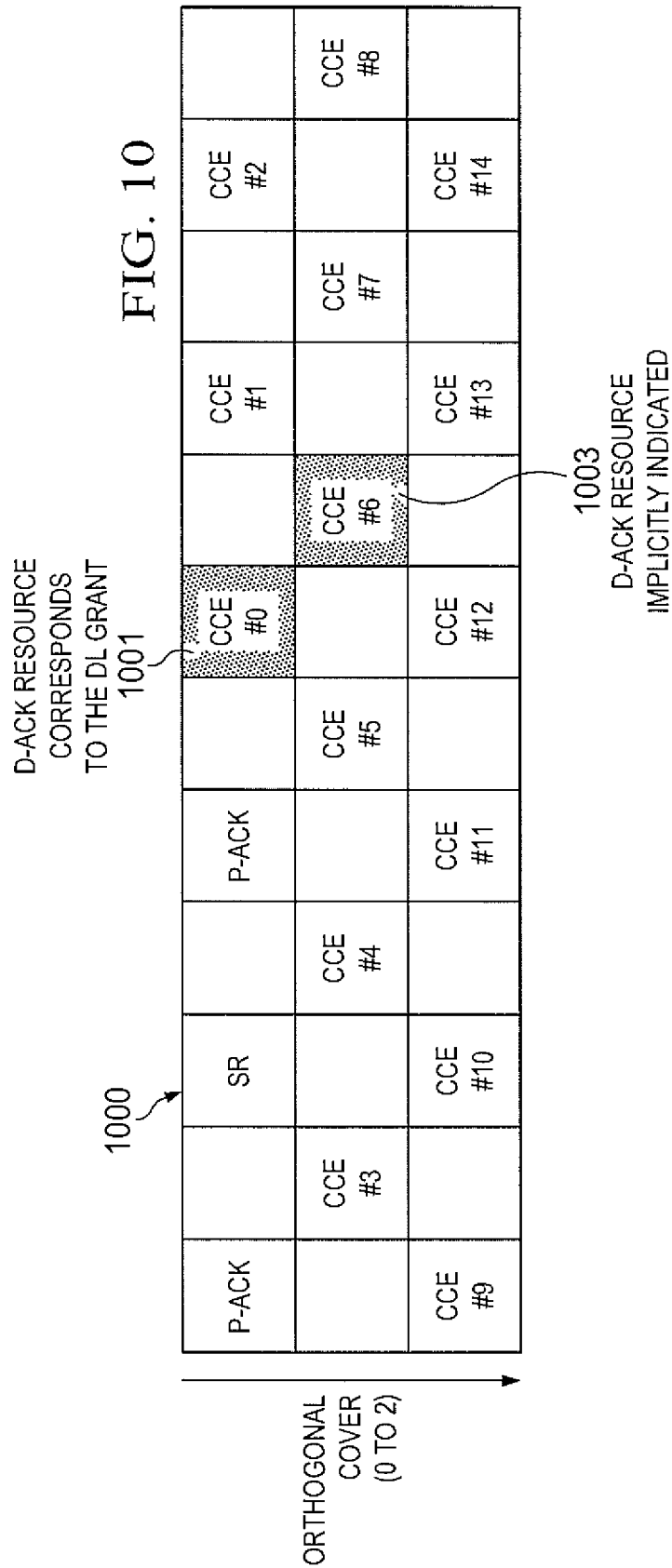
FIG. 10 illustrates a PUCCH resource map according to a second embodiment of the disclosure.

FIG. 10 illustrates a PUCCH resource map 1000 according to a second embodiment of the disclosure.

In the second embodiment, the additional PUCCH resource index for the UE in subframe n is the PUCCH resource index corresponding to the CCE index $n_{CCE}+12/\Delta_{shift}^{PUCCH}$ if the CCE index having carried the UE's DL grant in subframe n-k is $n_{CCE}$, where $\Delta_{shift}^{PUCCH}$ can be 1, 2 or 3. In this embodiment, $\Delta_{shift}^{PUCCH}$ is higher-layer signaled, and determines the number of empty PUCCH resources that will be placed between two PUCCH resources mapped from two adjacent CCE indices as defined in 5.4.1 in 36.211 of 3GPP TS 36211 V8.4.0, "3rd Generation Partnership Project; Technical Specification Group Radio Access Network; Evolved Universal Terrestrial Radio Access (E-UTRA); Physical Channels and Modulation (Release 8)", September 2008, which is hereby incorporated by reference into the present application as if fully set forth herein.

As shown in FIG. 10, $\Delta_{shift}^{PUCCH}=2$. Therefore, two consecutive CCE indices will be mapped to two PUCCH resources 1001 and 1003 spaced apart by one PUCCH resource. In general, two consecutive CCE indices are mapped to two PUCCH resources spaced apart by $\Delta_{shift}^{PUCCH}-1$ resources. In the example shown in FIG. 9, CCE#0 carries the DL grant for a UE in subframe n-k, and the PUCCH resource corresponding to CCE# $(12/\Delta_{shift}^{PUCCH})$ or CCE#6 is the additional PUCCH resource for the UE. In addition, the eNodeB would not use CCE#6 in subframe n-k for the other UEs' DL grant.

Figure 11:
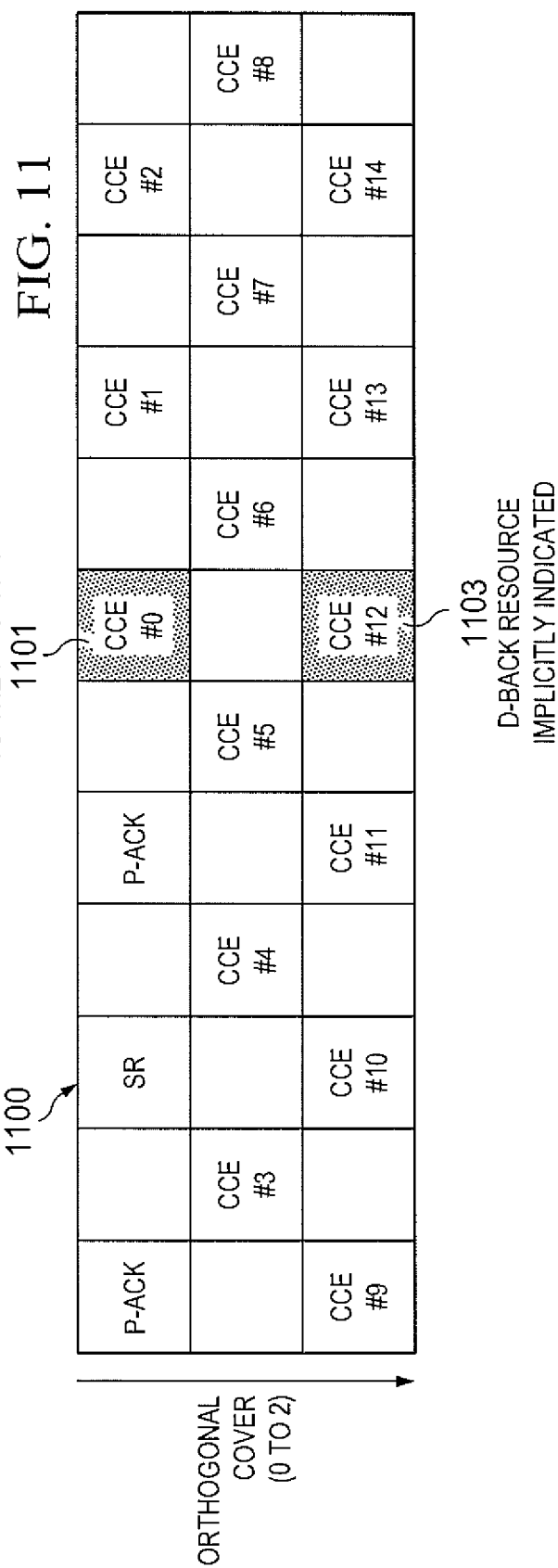
FIG. 11 illustrates a PUCCH resource map according to a third embodiment of the disclosure.

FIG. 11 illustrates a PUCCH resource map 1100 according to a third embodiment of the disclosure.

In the third embodiment, the additional (or the second) PUCCH resource for the UE in subframe n has a different OC from, and the same CS and RB as the PUCCH resource triple (or the first PUCCH resource triple) corresponding to the CCE index that sent the DL grant.

In the example shown in FIG. 11, if CCE#0 carries the DL grant for a UE in subframe n-k and is mapped to PUCCH AN resource triple (RB,CS,OC)=(j, 6, 0), then two PUCCH resource triples (j, 6, 0) and (j, 6, 2) 1101 and 1103 will be used for 2-Tx ORT in subframe n. In this case, the OC of the second PUCCH AN resource 1103 is identified by an equation $N_{OC,2}=\mod(N_{OC,1}+2,3)$, where $N_{OC,1}$ is the OC of the first PUCCH AN resource 1101. Since PUCCH resource triple (j, 6, 2) corresponds to CCE #12, the eNodeB would not use CCE#12 in subframe n-k for the other UEs' DL grant.

Figure 12:
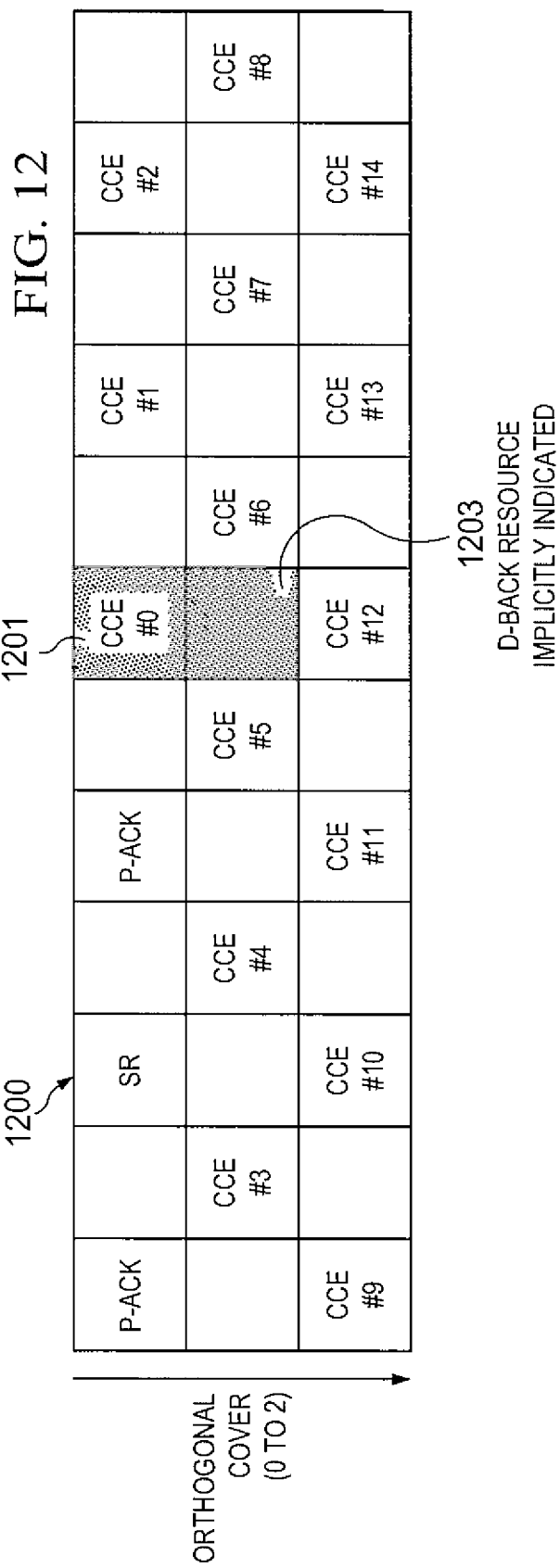
FIG. 12 illustrates a PUCCH resource map according to a further third embodiment of the disclosure.

FIG. 12 illustrates a PUCCH resource map 1200 according to a further third embodiment of the disclosure.

In another example of the third embodiment shown in FIG. 12, if CCE#0 carries the DL grant for a UE in subframe n-k and is mapped to PUCCH AN resource triple (RB,CS,OC)=(j, 6, 0), then two PUCCH resource triples (j, 6, 0) and (j, 6, 1) 1201 and 1203 will be used for 2-Tx ORT in subframe n. In this case, the OC of the second PUCCH AN resource 1203 is identified by an equation $N_{OC,2}=\mod(N_{OC,1}+1,3)$. Since PUCCH resource triple (j, 6, 1) does not correspond to any CCEs, the eNodeB does not have scheduling restriction in subframe n.

Figure 13:
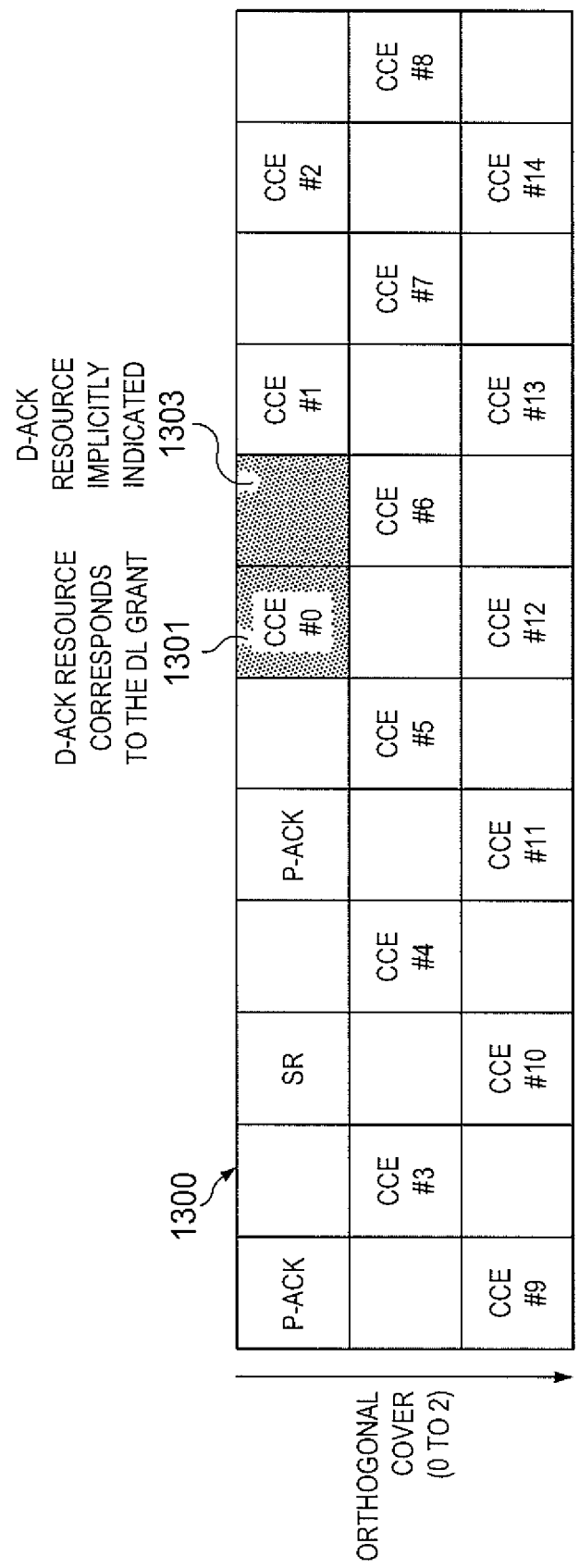
FIG. 13 illustrates a PUCCH resource map according to a fourth embodiment of the disclosure.

FIG. 13 illustrates a PUCCH resource map 1300 according to a fourth embodiment of the disclosure.

In the fourth embodiment, the additional (or second) PUCCH resource for the UE in subframe n has a different CS from, and the same OC and RB as the PUCCH resource triple (or the first PUCCH resource triple) corresponding to the CCE index that sent the DL grant.

In the example shown in FIG. 13, if CCE#0 carries the DL grant for a UE in subframe n-k and is mapped to PUCCH AN resource triple (RB,CS,OC)=(j, 6, 0), then two PUCCH resource triples (j, 6, 0) and (j, 7, 0) 1301 and 1303 will be used for 2-Tx ORT in subframe n. In this case, the CS of the second PUCCH AN resource 1303 is identified by an equation $N_{CS,2}=\mod(N_{CS,1}+1,3)$, where $N_{CS,1}$ is the CS of the first PUCCH AN resource 1301. Since PUCCH resource triple (j, 7, 0) does not correspond to any CCEs, the eNodeB does not have scheduling restriction in subframe n.

Figure 14:
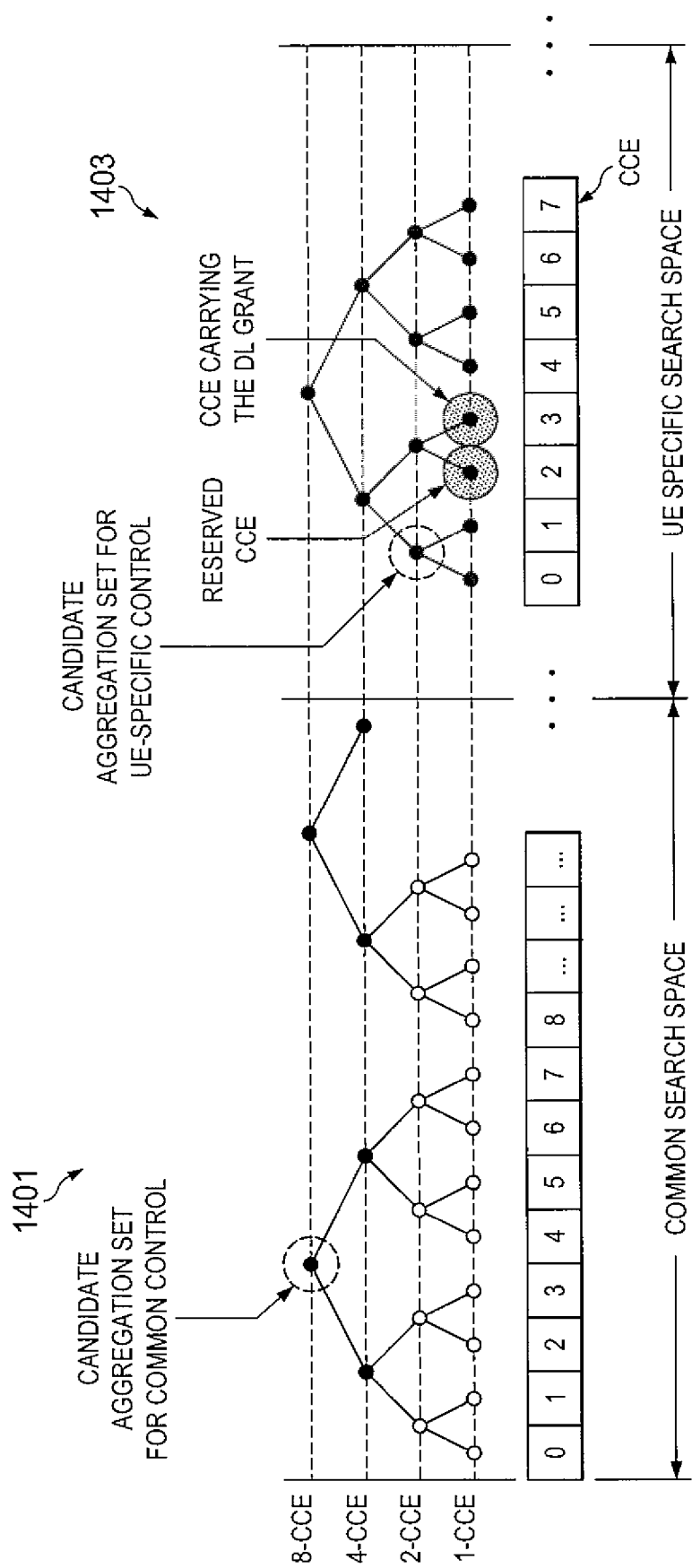
FIG. 14 illustrates CCE tree diagrams according to a fifth embodiment of the disclosure.

FIG. 14 illustrates CCE tree diagrams according to a fifth embodiment of the disclosure.

In the fifth embodiment, the additional PUCCH resource index for the UE in subframe n is the PUCCH resource index corresponding to the pair CCE index in a CCE tree diagram of the CCE index that carried the UE's DL grant. FIG. 14 shows a CCE tree diagram 1401 in the common search space and a CCE tree diagram 1403 the UE-specific search space. In a CCE tree diagram in a search space, two CCE indices are paired at the lowest (or the leaf) level. In other words, two CCE indices are paired as leaf nodes sharing a common parent. For example, in the common search space 1401, CCE index pairs (0,1) are leaf nodes sharing a common parent, (2,3) are leaf nodes sharing a common parent, (4,5) are leaf nodes sharing a common parent, and so forth. Assuming that CCE#0 and CCE#1 are a CCE pair in the leaf level sharing a common branch node or parent, if CCE#0 carries the DL grant for a UE in subframe n-k, then the PUCCH resource corresponding to CCE#1 will be allocated for the UE's ORT transmission in subframe n. On the other hand, if CCE#1 carries the DL grant for a UE in subframe n-k, the PUCCH resource corresponding to CCE#0 will be allocated for the UE's ORT transmission in subframe n.

In a particular embodiment, if the first CCE index $n_{CCE}$ is an even integer, then the additional PUCCH resource index corresponds to $n_{CCE}+1$, and if the first CCE index $n_{CCE}$ is an odd integer, then the additional PUCCH resource index corresponds to $n_{CCE}-1$.

The restricted CCE resources may or may not be used for carrying other control messages. The restricted CCE resource is utilized in various ways, such as:
 the reserved CCE is not used for any control signalling;
 the reserved CCE carries UL grant for the UE;
 the reserved CCE carries UL grant for another UE; and
 the reserved CCE carries a paging message.

Of course, these are just a few examples of using the reserved CCEs for control messages other than the DL grants.

In further embodiments, multiple PUCCH P-ACK/NACK and SR (P-ACK/SR) resources are assigned through higher-layer (or RRC) signaling to a UE implementing ORT.

In one embodiment, N P-ACK/SR resources are assigned to a UE by higher-layer (or RRC) signaling to allow a UE to perform N-Tx ORT. Note that in LTE systems, only one P-ACK/SR resource is assigned to a UE by higher-layer signaling. In a further embodiment, the current LTE higher-layer signaling is used to indicate one of the N P-ACK/SR resources to a UE implementing N-Tx ORT and to define a mapping function from the one PUCCH P-ACK/SR resource to the additional N-1 PUCCH P-ACK/SR resources for the UE. In such an embodiment, the mapping function can be performed, for example, using the third or fourth embodiments by substituting the D-ACK resource corresponding to a DL grant with P-ACK resource indicated by the higher-layer signaling and substituting the D-ACK resource implicitly indicated with P-ACK resource implicitly indicated.

Figure 15:
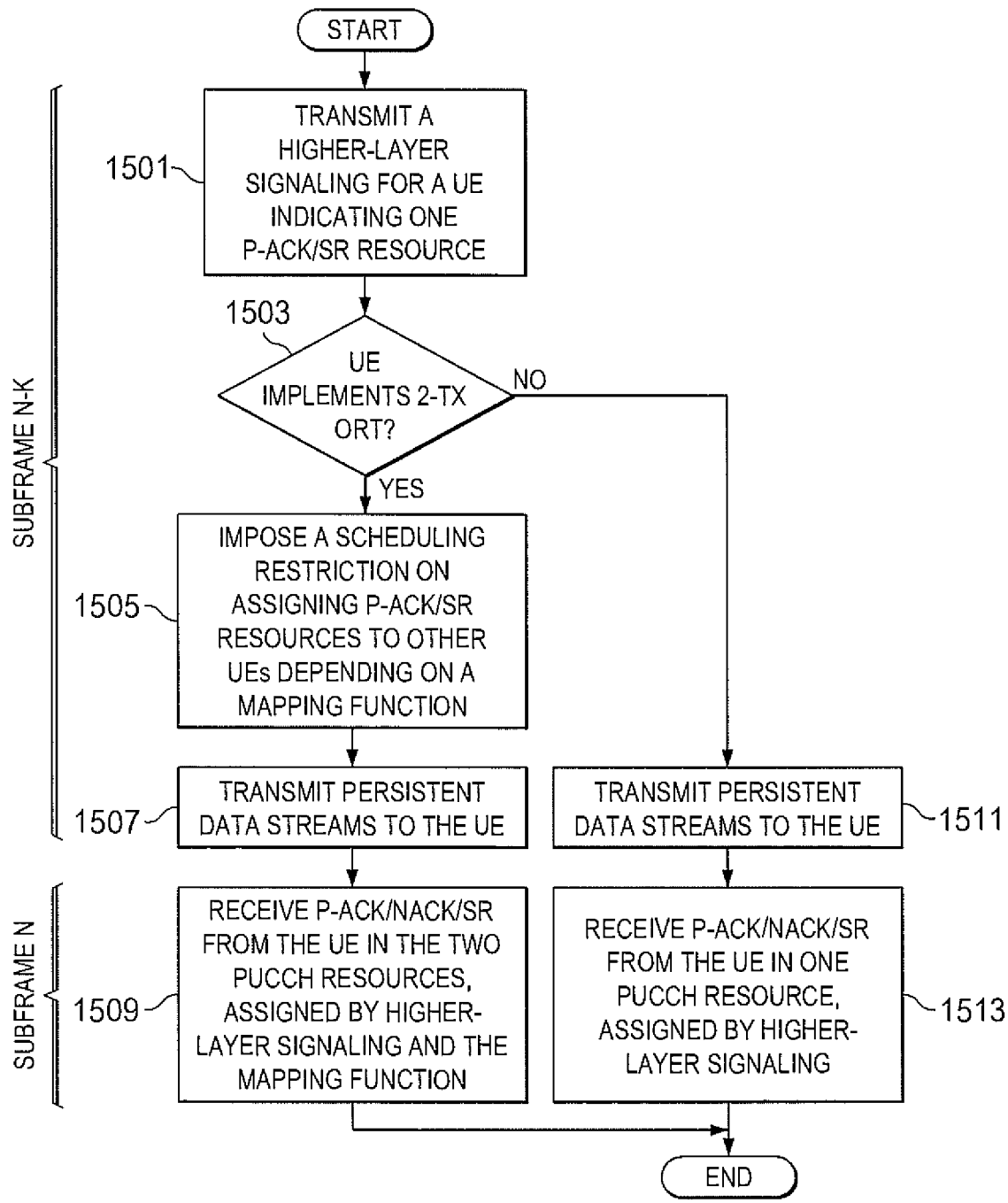
FIG. 15 illustrates a method of reserving CCEs at an eNodeB according to another embodiment of the disclosure.

FIG. 15 illustrates a method 1500 of reserving CCEs at an eNodeB according to another embodiment of the disclosure.

As shown in FIG. 15, the eNodeB sends a higher-layer signaling indicating one P-ACK/SR resource for a UE (block 1501). The eNodeB also determines if the UE will implement 2-TX ORT (block 1503). If the UE will implement 2-TX ORT, the eNodeB imposes a scheduling restriction on assigning P-ACK/SR resources to other UEs depending on a mapping function (block 1505), and transmits persistent data streams to the UE (block 1507). The eNodeB then receives P-ACK/NACK/SR from the UE in the two PUCCH resources assigned by higher-layer signaling and the mapping function (block 1509).

If the UE will not implement 2-TX ORT, the eNodeB transmits persistent data streams to the UE (block 1511), and receives P-ACK/NACK/SR from the UE in the one PUCCH resource assigned by higher-layer signaling (block 1513).

Figure 16:
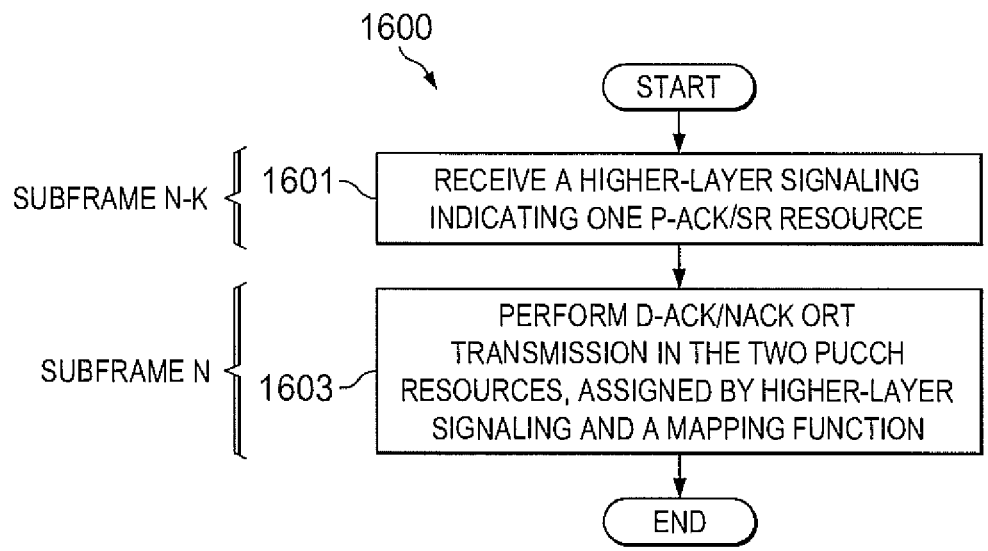
FIG. 16 illustrates a method of implementing a 2-TX ORT at a UE according to another embodiment of the disclosure.

FIG. 16 illustrates a method 1600 of implementing a 2-TX ORT at a UE according to another embodiment of the disclosure.

As shown in FIG. 16, the UE receives a higher-layer signaling from an eNodeB indicating one P-ACK/SR resource (block 1601). The UE then performs D-ACK/NACK ORT transmission in the two PUCCH resources assigned by higher-layer signaling and a mapping function (block 1603).

Although the methods illustrated in FIGS. 15 and 16 are described in terms 2-Tx ORT, one of ordinary skill in the art would recognize that the methods of FIGS. 15 and 16 can easily be revised for any number of Tx antennas. Blocks 1505 and 1509 in FIG. 15 and block 1603 in FIG. 16 are the relevant blocks where a choice of a mapping function would take effect.

In other embodiments, multiple PUCCH CQI resources are assigned through higher-layer (or RRC) signaling to an UE implementing ORT.

In one such embodiment, N PUCCH CQI resources are assigned to a UE by higher-layer (or RRC) signaling to allow the UE to perform N-Tx ORT. Note that in the LTE system, only one CQI resource is assigned to a UE by higher-layer signaling. In further embodiments, the current LTE higher-layer signaling is used to indicate one of the N CQI resources to a UE implementing N-Tx ORT and to define a mapping function from the one CQI resource to the additional N-1 CQI resources for the UE.

In such embodiments, the mapping function can be performed, for example, using the fourth embodiment by substituting the D-ACK resource corresponding to a DL grant with the PUCCH CQI resource indicated by the higher-layer signaling, and by substituting the D-ACK resource implicitly indicated with the PUCCH CQI resource implicitly indicated.

Figure 17:
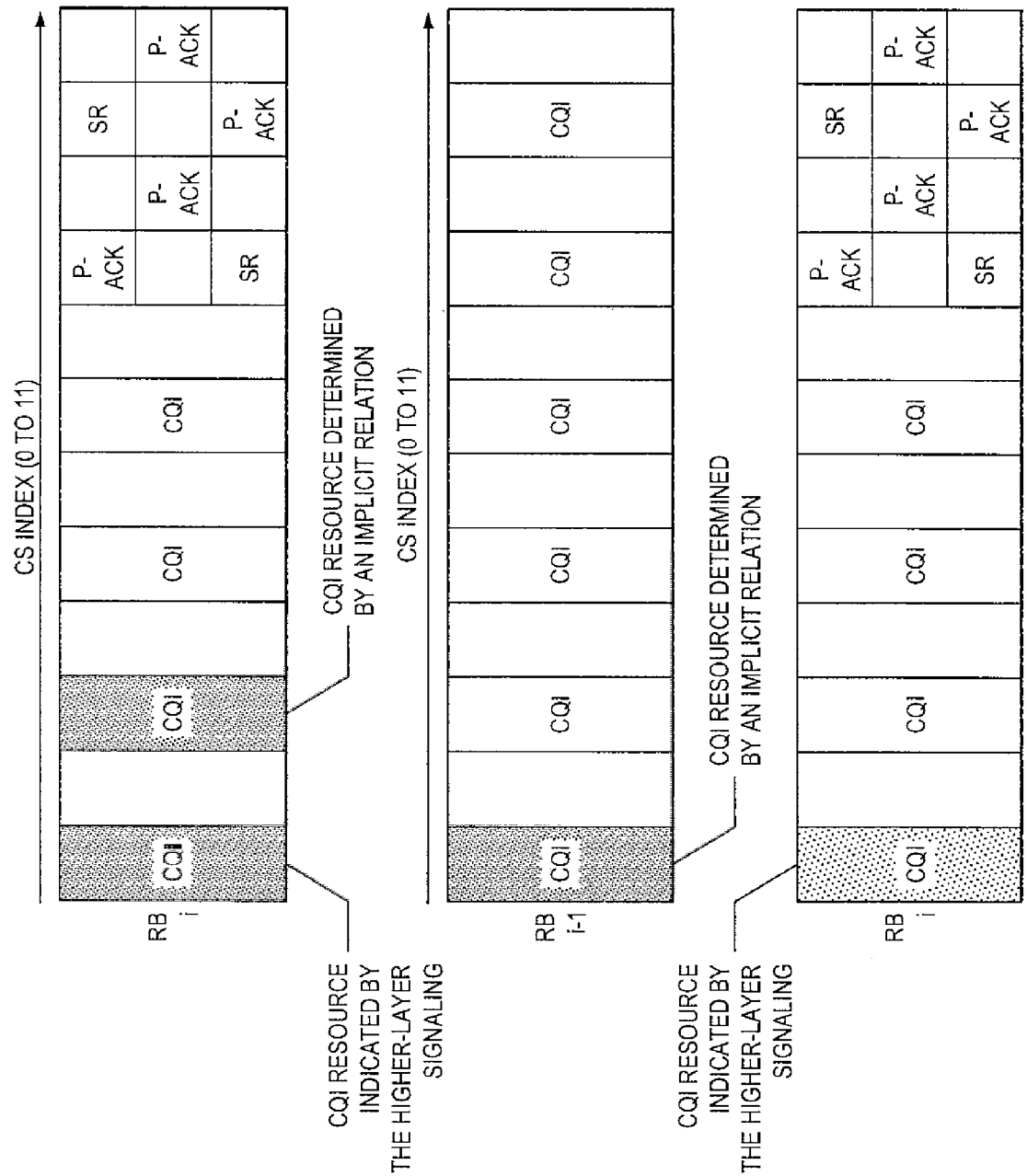
FIG. 17 illustrates multiple PUCCH channel quality information (CQI) resource indicators for ORT according to an embodiment of the disclosure.

FIG. 17 illustrates multiple PUCCH CQI resource indicators for ORT according to an embodiment of the disclosure.

FIG. 17 illustrates an example of a mapping function using the fourth embodiment to generate multiple CQI resource indicators as shown in the left hand side of FIG. 17. In this example, a CQI resource corresponding to an index pair (RB, CS)=(i,0) is signalled by a higher-layer signaling to a UE. The UE then uses another index pair (RB,CS)=(i,2) (a second CQI resource) for implementing ORT. In this case, the CS of the second PUCCH CQI resource is identified by an equation $N_{CS,2}=mod(N_{CS,1}+\Delta_{shift}^{PUCCH}12)$, where $N_{CS,1}$ is the CS of the first PUCCH CQI resource and $\Delta_{shift}^{PUCCH}=2$. In general, the embodiment may have $N_{CS,2}=mod(N_{CS,1}+N_{CS,offset}, 12)$, where $N_{CS,offset}$ is an integer.

Another example of a mapping function used for multiple CQI resource indication is shown in the right hand side of FIG. 17. In the example, a CQI resource corresponding to an index pair (RB,CS)=(i,0) is signalled by a higher-layer signaling to the UE. The UE then uses another index pair (RB, CS)=(i−1,0) (a second CQI resource) for implementing ORT. In this case, the RB index of the second PUCCH CQI resource is identified by an equation $N_{RB,2}=N_{RB,1}-1$, where $N_{RB,1}$ is the RB index of the first PUCCH CQI resource.

Figure 18:
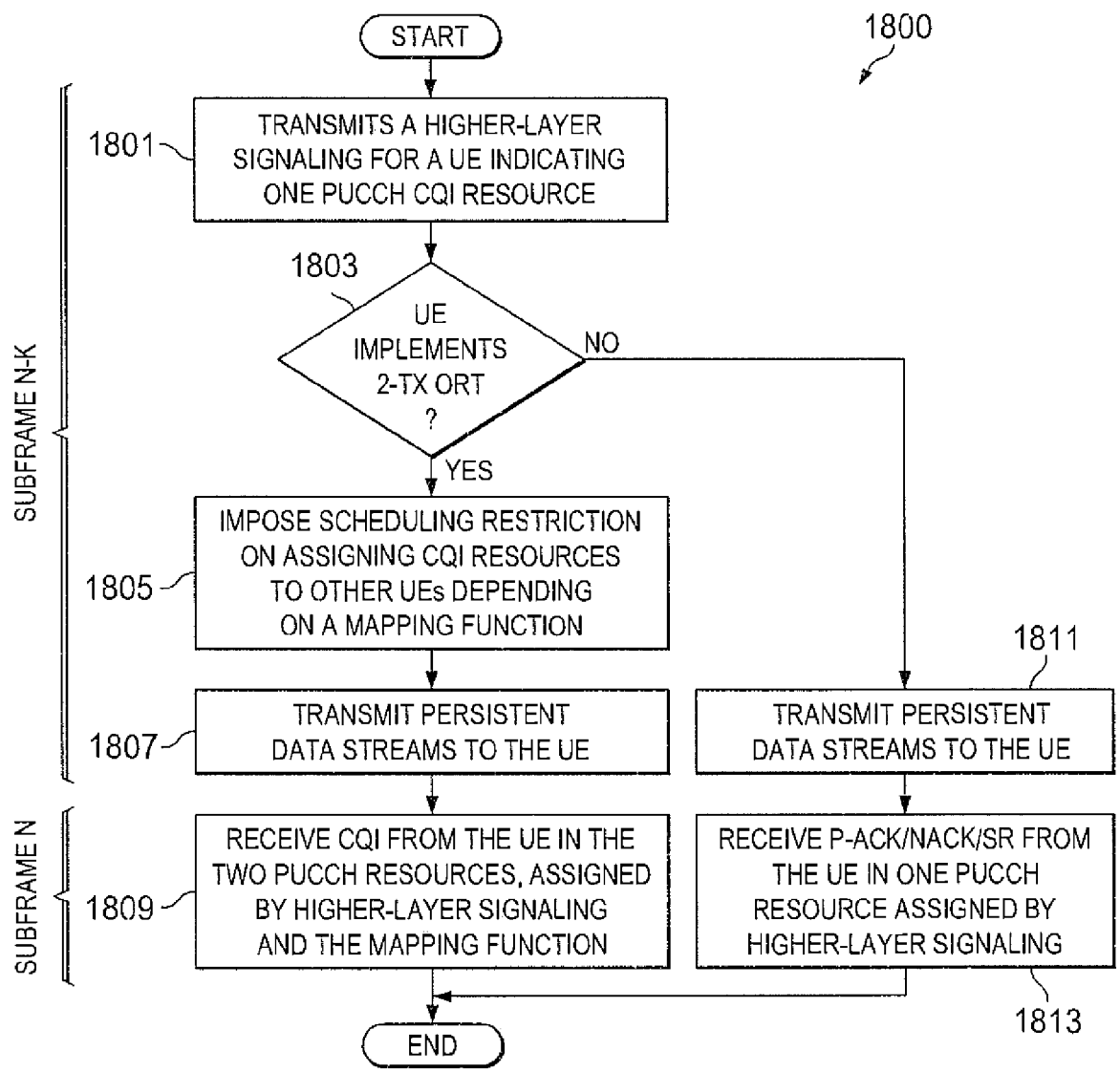
FIG. 18 illustrates a method of reserving CCEs at an eNodeB according to another embodiment of the disclosure.

FIG. 18 illustrates a method 1800 of reserving CCEs at an eNodeB according to another embodiment of the disclosure.

As shown in FIG. 18, the eNodeB sends a higher-layer signaling indicating one PUCCH CQI resource for a UE (block 1801). The eNodeB also determines if the UE will implement 2-TX ORT (block 1803). If the UE will implement 2-TX ORT, the eNodeB imposes a scheduling restriction on assigning CQI resources to other UEs depending on a mapping function (block 1805), and transmits persistent data streams to the UE (block 1807). The eNodeB then receives CQI from the UE in the two PUCCH resources assigned by higher-layer signaling and the mapping function (block 1809).

If the UE will not implement 2-TX ORT, the eNodeB transmits persistent data streams to the UE (block 1811), and receives QCI from the UE in the one PUCCH resource assigned by higher-layer signaling (block 1813).

Figure 19:
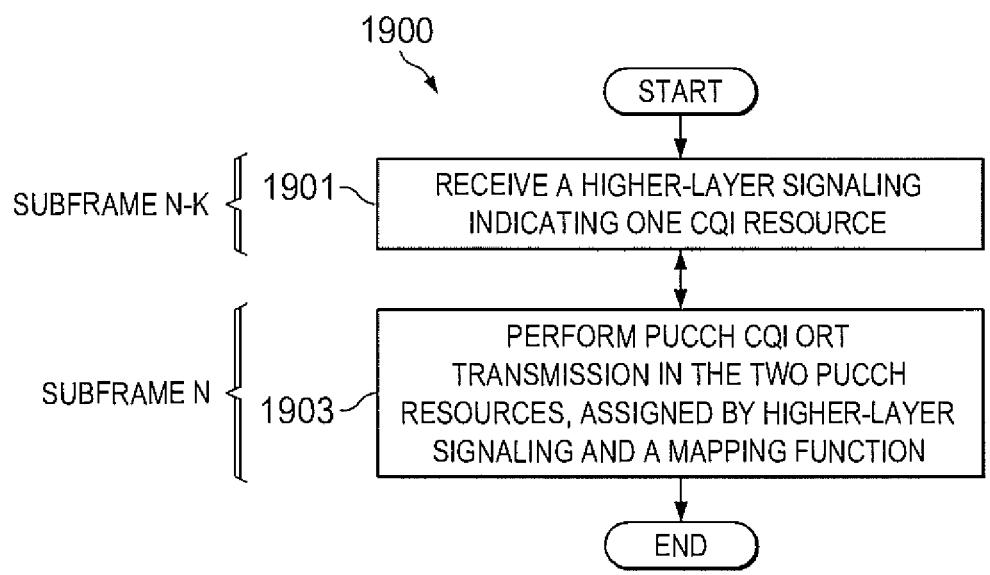
FIG. 19 illustrates a method of implementing a 2-TX ORT at a UE according to another embodiment of the disclosure.

FIG. 19 illustrates a method 1900 of implementing a 2-TX ORT at a UE according to another embodiment of the disclosure.

As shown in FIG. 19, the UE receives a higher-layer signaling from an eNodeB indicating one CQI resource (block 1901). The UE then performs CQI ORT transmission in the two PUCCH resources assigned by higher-layer signaling and a mapping function (block 1903).

Although the methods illustrated in FIGS. 18 and 19 are described in terms 2-Tx ORT, one of ordinary skill in the art would recognize that the methods of FIGS. 18 and 19 can easily be revised for any number of Tx antennas. Blocks 1805 and 1809 in FIG. 18 and block 1903 in FIG. 19 are the relevant blocks where a choice of a mapping function would take effect.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
   a transmit path circuitry configured to:
       transmit a downlink (DL) grant in a single control channel element (CCE) to a subscriber station in a subframe n-k, the subscriber station performing an orthogonal transmit diversity scheme using N transmit antennas (N-Tx ORT) with N being a positive integer greater than 1, and
       transmit data streams to the subscriber station; and
   a receive path circuitry configured to receive an acknowledgement signal from the subscriber station in response to the data streams, the acknowledgement signal carried in at least two physical uplink control channel (PUCCH) resources in a subframe n,
   wherein a first resource of the at least two PUCCH resources is assigned by a first CCE index $n_{CCE}$ corresponding to the control channel element used to transmit the downlink grant in the subframe n-k and a second resource of the at least two PUCCH resources is assigned by a mapping function, and
   wherein the mapping function assigns the second resource by mapping the first CCE index $n_{CCE}$ to an additional PUCCH resource index in the subframe n.

2. The base station in accordance with claim 1 wherein the additional PUCCH resource index for the subscriber station in the subframe n is a PUCCH resource index corresponding to a CCE index $n_{CCE}+1$.

3. The base station in accordance with claim 1 wherein the additional PUCCH resource index for the subscriber station in the subframe n is a PUCCH resource index corresponding to a CCE index $n_{CCE}+12/\Delta_{shift}^{PUCCH}$, where $\Delta_{shift}^{PUCCH}$ is a positive integer conveyed in radio resource control (RRC) signaling.

4. The base station in accordance with claim 1 wherein the second resource for the subscriber station in the subframe n has a different orthogonal cover sequence (OC) index from an OC index of the first resource, and
   wherein the second resource for the subscriber station in the subframe n has a same cyclic shift (CS) index and a same resource block (RB) index as a CS index and an RB index of the first resource.

5. The base station in accordance with claim 1 wherein the second resource for the subscriber station in the subframe n has a different cyclic shift (CS) index from a CS index of the first CCE index $n_{CCE}$, and
   wherein the second resource for the subscriber station in the subframe n has a same orthogonal cover sequence (OC) index and a same resource block (RB) index as an OC index and an RB index of the CCE index $n_{CCE}$.

6. The base station in accordance with claim 1 wherein the additional PUCCH resource index corresponds to a second CCE index, and
   wherein the second CCE index corresponds to a leaf node sharing a common parent with the first CCE index $n_{CCE}$ in a CCE tree diagram.

7. The base station in accordance with claim 6 wherein if the first CCE index $n_{CCE}$ is an even integer, then the additional PUCCH resource index corresponds to $n_{CCE}+1$, and
   if the first CCE index $n_{CCE}$ is an odd integer, then the additional PUCCH resource index corresponds to $n_{CCE}-1$.

8. A method of operating a base station, the method comprising:
   transmitting a downlink (DL) grant in a single control channel element (CCE) to a subscriber station in a subframe n-k, the subscriber station performing an orthogonal transmit diversity scheme using N transmit antennas (N-Tx ORT) with N being a positive integer greater than 1;
   transmitting data streams to the subscriber station; and
   receiving an acknowledgement signal from the subscriber station in response to the data streams, the acknowledgement signal carried in at least two physical uplink control channel (PUCCH) resources in a subframe n,
   wherein a first resource of the at least two PUCCH resources is assigned by a first CCE index $n_{CCE}$ corresponding to the control channel element used to transmit the downlink grant in the subframe n-k and a second resource of the at least two PUCCH resources is assigned by a mapping function, and
   wherein the mapping function assigns the second resource by mapping the first CCE index $n_{CCE}$ to an additional PUCCH resource index in the subframe n.

9. The method in accordance with claim 8 wherein the additional PUCCH resource index for the subscriber station in the subframe n is a PUCCH resource index corresponding to a CCE index $n_{CCE}+1$.

10. The method in accordance with claim 8 wherein the additional PUCCH resource index for the subscriber station in the subframe n is a PUCCH resource index corresponding to a CCE index $n_{CCE}+12/\Delta_{shift}^{PUCCH}$, where $\Delta_{shift}^{PUCCH}$ is a positive integer conveyed in radio resource control (RRC) signaling.

11. The method in accordance with claim 8 wherein the second resource for the subscriber station in the subframe n has a different orthogonal cover sequence (OC) index from an OC index of the first resource, and
   wherein the second resource for the subscriber station in the subframe n has a same cyclic shift (CS) index and a same resource block (RB) index as a CS index and an RB index of the first resource.

12. The method in accordance with claim 8 wherein the second resource for the subscriber station in the subframe n has a different cyclic shift (CS) index from a CS index of the first CCE index $n_{CCE}$, and
   wherein the second resource for the subscriber station in the subframe n has a same orthogonal cover sequence (OC) index and a same resource block (RB) index as an OC index and an RB index of the first CCE index $n_{CCE}$.

13. The method in accordance with claim 8 wherein the additional PUCCH resource index corresponds to a second CCE index, and
   wherein the second CCE index corresponds to a leaf node sharing a common parent with the first CCE index $n_{CCE}$ in a CCE tree diagram.

14. The method in accordance with claim 13 wherein if the first CCE index $n_{CCE}$ is an even integer, then the additional PUCCH resource index corresponds to $n_{CCE}+1$, and
   if the first CCE index $n_{CCE}$ is an odd integer, then the additional PUCCH resource index corresponds to $n_{CCE}-1$.

15. A subscriber station comprising:
   a transmit path circuitry configured to perform an orthogonal transmit diversity scheme using N transmit antennas (N-Tx ORT) with N being a positive integer greater than 1; and
   a receive path circuitry configured to:
      receive a downlink (DL) grant in a single control channel element (CCE) from a base station in a subframe n-k, while the transmit path circuitry performs the orthogonal transmit diversity scheme using N transmit antennas (N-Tx ORT), and
      receive data streams from the base station,
   wherein the transmit path circuitry further is configured to transmit an acknowledgement signal to the base station in response to the data streams, the acknowledgement signal carried in at least two physical uplink control channel (PUCCH) resources in a subframe n,
   wherein a first resource of the at least two PUCCH resources is assigned by a first CCE index $n_{CCE}$ corresponding to the control channel element used to transmit the downlink grant in the subframe n-k and a second resource of the at least two PUCCH resources is assigned by a mapping function, and
   wherein the mapping function assigns the second resource by mapping the first CCE index $n_{CCE}$ to an additional PUCCH resource index in the subframe n.

16. The subscriber station in accordance with claim 15 wherein the additional PUCCH resource index for the subscriber station in the subframe n is a PUCCH resource index corresponding to a CCE index $n_{CCE}+1$.

17. The subscriber station in accordance with claim 15 wherein the additional PUCCH resource index for the subscriber station in the subframe n is a PUCCH resource index corresponding to a CCE index $n_{CCE}+12/\Delta_{shift}^{PUCCH}$, where $\Delta_{shift}^{PUCCH}$ is a positive integer conveyed in radio resource control (RRC) signaling.

18. The subscriber station in accordance with claim 15 wherein the second resource for the subscriber station in the subframe n has a different orthogonal cover sequence (OC) index from an OC index of the first resource, and
   wherein the second resource for the subscriber station in the subframe n has a same cyclic shift (CS) index and a same resource block (RB) index as a CS index and an RB index of the first resource.

19. The subscriber station in accordance with claim 15 wherein the second resource for the subscriber station in the subframe n has a different cyclic shift (CS) index from a CS index of the first CCE index $n_{CCE}$, and
   wherein the second resource for the subscriber station in the subframe n has a same orthogonal cover sequence (OC) index and a same resource block (RB) index as an OC index and an RB index of the first CCE index $n_{CCE}$.

20. The subscriber station in accordance with claim 15 wherein the additional PUCCH resource index corresponds to a second CCE index, and
   wherein the second CCE index corresponds to a leaf node sharing a common parent with the first CCE index $n_{CCE}$ in a CCE tree diagram.

21. The subscriber station in accordance with claim 20 wherein if the first CCE index $n_{CCE}$ is an even integer, then the additional PUCCH resource index corresponds to $n_{CCE}+1$, and if the first CCE index $n_{CCE}$ is an odd integer, then the additional PUCCH resource index corresponds to $n_{CCE}-1$.

22. A method of operating a subscriber station, the method comprising:

performing an orthogonal transmit diversity scheme using N transmit antennas (N-Tx ORT) with N being a positive integer greater than 1;

receiving a downlink (DL) grant in a single control channel element (CCE) from a base station in a subframe n-k, while the transmit path circuitry performs the orthogonal transmit diversity scheme using N transmit antennas (N-Tx ORT); and receiving data streams from the base station, transmitting an acknowledgement signal to the base station in response to the data streams, the acknowledgement signal carried in at least two physical uplink control channel (PUCCH) resources in a subframe n, wherein a first resource of the at least two PUCCH resources is assigned by a first CCE index $n_{CCE}$ corresponding to the control channel element used to transmit the downlink grant in the subframe n-k and a second resource of the at least two PUCCH resources is assigned by a mapping function, and wherein the mapping function assigns the second resource by mapping the first CCE index $n_{CCE}$ to an additional PUCCH resource index in the subframe n.

23. The subscriber station in accordance with claim 22 wherein the additional PUCCH resource index for the subscriber station in the subframe n is a PUCCH resource index corresponding to a CCE index $n_{CCE}+1$.

24. The subscriber station in accordance with claim 22 wherein the additional PUCCH resource index for the subscriber station in the subframe n is a PUCCH resource index corresponding to a CCE index $n_{CCE}+12/\Delta_{shift}^{PUCCH}$, where $\Delta_{shift}^{PUCCH}$ is a positive integer conveyed in radio resource control (RRC) signaling.

25. The subscriber station in accordance with claim 22 wherein the second resource for the subscriber station in the subframe n has a different orthogonal cover sequence (OC) index from an OC index of the first resource, and wherein the second resource for the subscriber station in the subframe n has a same cyclic shift (CS) index and a same resource block (RB) index as a CS index and an RB index of the first resource.

26. The subscriber station in accordance with claim 22 wherein the second resource for the subscriber station in the subframe n has a different cyclic shift (CS) index from a CS index of the first CCE index $n_{CCE}$, and wherein the second resource for the subscriber station in the subframe n has a same orthogonal cover sequence (OC) index and a same resource block (RB) index as an OC index and an RB index of the first CCE index $n_{CCE}$.

27. The subscriber station in accordance with claim 22 wherein the additional PUCCH resource index corresponds to a second CCE index, and wherein the second CCE index corresponds to a leaf node sharing a common parent with the first CCE index $n_{CCE}$ in a CCE tree diagram.

28. The subscriber station in accordance with claim 27 wherein if the first CCE index $n_{CCE}$ is an even integer, then the additional PUCCH resource index corresponds to $n_{CCE}+1$, and if the first CCE index $n_{CCE}$ is an odd integer, then the additional PUCCH resource index corresponds to $n_{CCE}-1$.

* * * * *